United States Patent [19]

Dunn et al.

[11] Patent Number: 4,790,943
[45] Date of Patent: Dec. 13, 1988

[54] RENOVATION OF USED WATER FROM POULTRY PROCESSING PLANTS

[75] Inventors: C. Lamar Dunn, Blount County; David L. Turner, Knox County, both of Tenn.

[73] Assignee: Southeastern Water Conservation Systems, Inc., Knoxville, Tenn.

[21] Appl. No.: 47,972

[22] Filed: May 7, 1987

[51] Int. Cl.$^4$ .............................................. C02F 1/56
[52] U.S. Cl. ................................. 210/705; 210/708; 210/721; 210/725; 210/727; 210/917
[58] Field of Search ............... 210/705, 708, 724, 725, 210/727, 728, 754, 758, 759, 917, 721

[56] References Cited

U.S. PATENT DOCUMENTS

| | | | |
|---|---|---|---|
| 3,846,293 | 11/1974 | Campbell | 210/725 |
| 4,013,555 | 3/1977 | Davis | 210/725 |
| 4,049,545 | 9/1977 | Horvath | 210/665 |
| 4,219,418 | 8/1980 | Pilon | 210/721 |

OTHER PUBLICATIONS

Literature Review, *JWPCF,* Jun. 1981, pp. 788-791.

*Primary Examiner*—Peter Hruskoci
*Attorney, Agent, or Firm*—Pitts and Brittian

[57] ABSTRACT

A process for treating effluent water of a poultry processing plant for reuse in that plant. According to the present invention, a treatment of the effluent with a strong oxidant and with a substance to reduce the pH to less than 5.2 pH units, and preferably about 3.0±0.5 pH units causes a floc to form together with a destruction of bacteria and a breaking of the oils and greases. The floc contains the impurities such that the water separated from the floc is sufficiently purified for reuse in certain processing steps in the plant. In the case of treating effluent water from the poultry chiller tank(s), the product water can be reused in the tank(s). In the preferred form of the process, formation of the floc is enhanced by the addition of an anionic polymer or other thickener/strengthener, and separation is achieved by dissolved air flotation techniques. A final filtration can be utilized after a readjustment of the pH to near neutral to match new water to be used in the plant. Results of a pilot facility are given, with the results indicating that USDA standards for reuse of chiller water are met or exceeded. The process has been approved by USDA for use in conjunction with poultry processing plants. Significant economic savings are realized.

17 Claims, 2 Drawing Sheets

RENOVATION OF USED WATER FROM POULTRY PROCESSING PLANTS

DESCRIPTION

1. Technical Field

This invention relates generally to the treatment of waste water, and more particularly to the treatment and renovation of wate water from the chiller and other water use applications of poultry processing plants such that the water can be reused with a minimum of makeup water.

2. Background Art

The U.S. Department of Agriculture (USDA) regulations concerning the operation of poultry processing plants include the requirement that the birds (chickens or turkeys) be rapidly cooled as a final step prior to packaging. This cooling substantially reduces the growth of bacteria, principally salmonella. The approved method to achieve the cooling is to subject the birds to a chilled water bath, with the cooling provided by ice or cooling coils. Typically the temperature of the bird is reduced from about 103 degrees Fahrenheit to about 40 degrees Fahrenheit.

As part of the present USDA regulations, at least 0.5 gallon of water must pass through the chiller for every bird that is processed. Typically, a process plant will handle 100,000 chickens per day; thus, at least 50,000 gallons of water must pass through the chiller each day. The cost of this water, as well as the cost of the processing of the same, add to the processing costs. As water purification and waste water treatment costs increase, the effect upon the poultry industry will also increase.

The USDA does permit recycling of the chiller water under certain conditions. The present standards for this permissible recycle are shown in Table I.

TABLE I

| MINIMUM PERCENT REDUCTION OF MICRO-ORGANISMS IN TREATED WATER | MINIMUM PERCENT LIGHT TRANSMISSION IN TREATED WATER | GALLONS OF RECONDITIONED WATER TO REPLACE ONE GALLON OF WATER |
|---|---|---|
| 60 | 60 | 1.75 |
| 70 | 70 | 1.50 |
| 80 | 80 | 1.35 |
| 90 | 80 | 1.25 |
| 98 | 80 | 1.10 |

For example, if the withdrawn chiller water is processed to give a sixty percent reduction in micro-organisms and has a light transmission at least sixty percent of tap water, 1.75 gallons of treated water can be used instead of one gallon of fresh water. Obviously, this will necessitate fresh makeup water and the ultimate processing of the waste. No process is known in the prior art that is sufficiently efficient to provide recycle water of a quality that will require only very small amounts of makeup water (i.e., meet the ninety-eight percent reduction of micro-organisms and have at least eighty percent light transmission).

Large quantities of water are also utilized for other aspects of the poultry processing. For example, high temperature water is used for bird washing and scalding preparatory to defeathering. Water is used for evisceration as well as general wash-down of the processing plant. Some of the water is used for several steps in the process. Because of the content of this used water, waste water treatment facilities charge a premium rate for processing this spent water. As in the case of the chiller water, a poultry processing plant uses, and therefore must discharge sizeable quantities of this process water therefore adding significantly to the cost due to the water price and the sewer charges.

Accordingly, it is a principal object of the present invention to provide a process for treating and renovating water used in a poultry processing plant such that the micro-organisms are sufficiently removed, such that the product water can be reused for specific applications in the processing plant to minimize the quantity of fresh water that must be added.

It is another object of the present invention to provide a process for treating water discharged from a poultry processing plant whereby the quantity of waste to be discharged to a sewer system is minimized.

It is also an object of the present invention to provide a process for the treating and renovating of water discharged from the chiller of a poultry processing plant such that the micro-organisms are sufficiently removed and the light transmission sufficiently improved such that the product water of the process can be reused in the chiller.

It is a further object of the present invention to provide a treatment process that will be approved by the U.S. Department of Agriculture for treating water discharged from a chiller of a poultry processing plant such that the treated water can be effectively reused in the chiller.

These and other objects of the present invention will become more apparent upon a consideration of the accompanying drawings and a detailed description of the invention.

DISCLOSURE OF THE INVENTION

In accordance with the present invention water used in a poultry processing plant, such as overflow from a poultry chiller, is adjusted to a low value of pH, e.g., less than about 5.2, as with sulphuric acid or the like acid, and treated with a strong oxidant (e.g., chlorine or the like). This causes a formation of a floc that, in the preferred embodiment, can then be enhanced through the addition of appropriate polymers. The solid material is then removed for transfer to the poultry plant waste, and the liquid phase is recycled for use in a poultry processing plant chiller. The water is substantially cleansed of impurities such that it can be reused in the chiller. This separation can be achieved as with dissolved air flotation, clarification and filtration, for example.

DETAILED DESCRIPTION OF THE INVENTION

Figure 1:
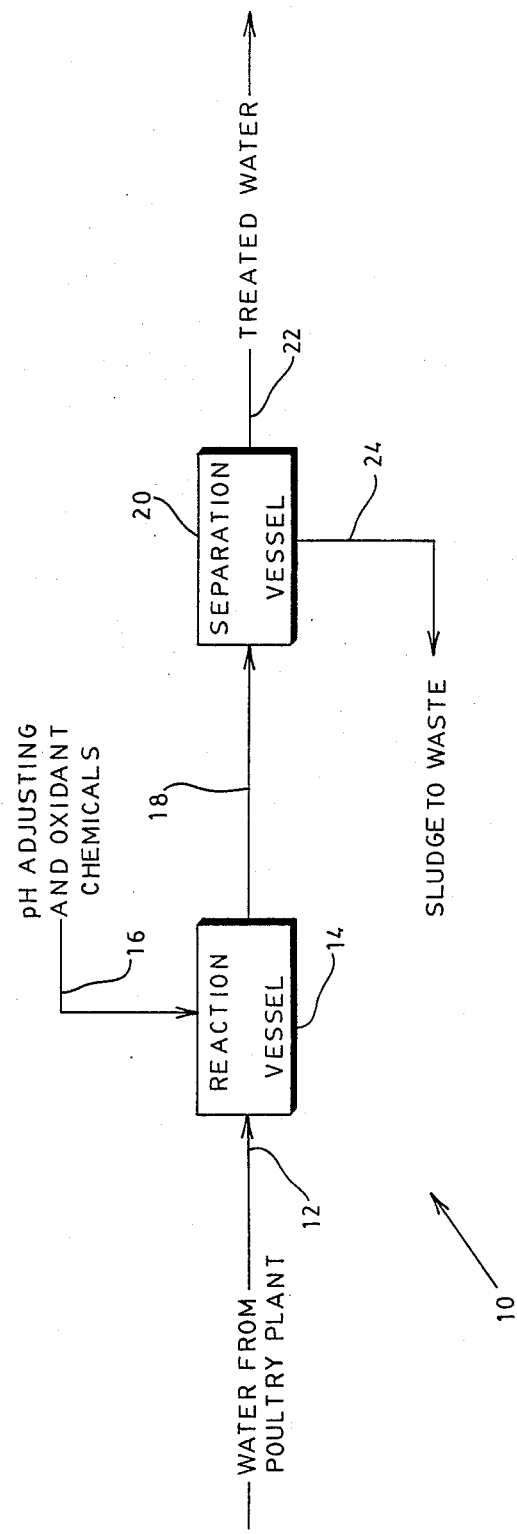
FIG. 1 is a schematic block diagram illustrating the essential steps for the treatment of water from a poultry processing plant to achieve water that can be effectively recycled for use in the plant.

Referring now to FIG. 1, shown at 10 therein is a block diagram of a process for treating water discharged from various steps performed in a poultry processing plant. This would include water discharged from the chiller. As stated, this process is associated with a plant processing chickens, turkeys, etc., although the predominant use is in plants for the processing of chickens. Water from various processing steps, including the chiller, enters the processing system through line 12. This water will contain, in the case of the chiller, principally blood, fats and greases (usually as emulsions), and various bacteria. Water from other steps will contain these and many other "contaminents" depending upon the specific uses of the water in the plant. This water is contacted within a reaction vessel 14 with chemicals introduced through line 16 to reduce the pH to less than about 5.2 pH units, and preferably about 3.0±0.5 units with, for example, sulfuric acid. Other acids, such as nitric, hydrochloric, etc., can also be used. Use of a strong acid reduces the quantity of material to required achieve a desired pH level. The waste water, having been adjusted for pH, is contacted with a strong oxidant. A typical oxidant is chlorine gas; however, other strong oxidants will provide a comparable result. One such oxidant is potassium permanganate (not presently approved for contact with food products). Other suitable oxidants are chlorine dioxide and ozone. The combined action of pH adjustment and the oxidant oxidizes the color of the waste water, breaks down the fat and grease emulsions, and creates a floc of the impurities. At the same time, the bacteria in the waste water are substantially destroyed. Although not illustrated in FIG. 1, other additives can be used to enhance (thicken and strengthen) the formation of the floc.

The water and floc pass through a line 18 into separation vessel 20. Therein the water and floc are separated, with the water leaving through line 22 for reuse. The solids are transmitted to the sewer or other waste collection, in concentrated form, through line 24. Separation by simple filtration is usually sufficient; however, use of dissolved air flotation can be used as part of the separation. Although FIG. 1 is drawn to illustrate separate contacting and separation vessels, it will be understood that the process steps can be carried out in a single vessel.

Figure 2:
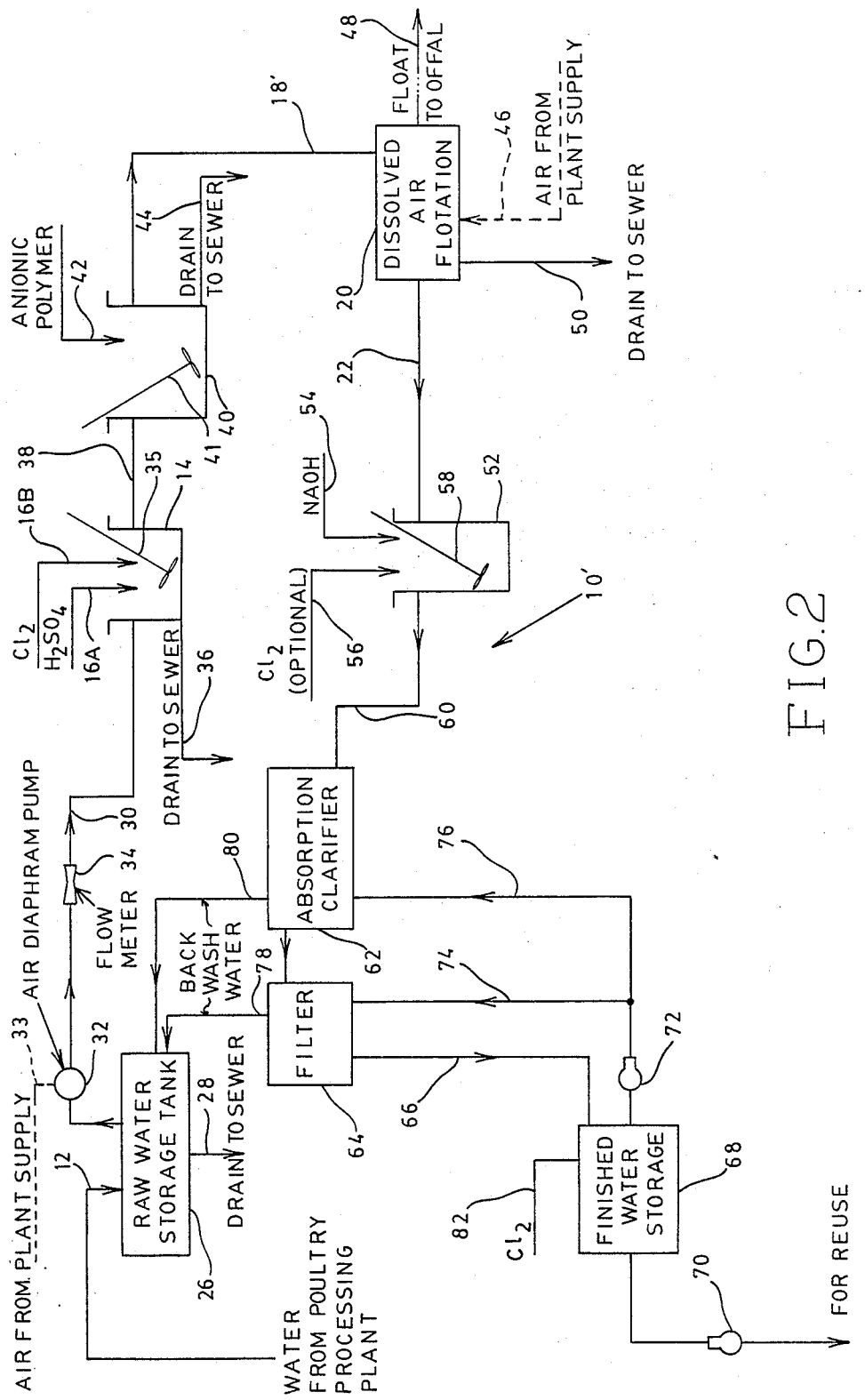
FIG. 2 is a schematic block diagram illustrating the steps of a process as approved by the U.S. Department of Agriculture for the treatment of water from a poultry chiller to achieve water that can be effectively recycled to the chiller.

A more detailed drawing of a process for treating water from a poultry processing plant is illustrated in FIG. 2. The conditions of the process 10' shown therein have been tested in a pilot plant for treating water from a chiller, and the process shown therein has been approved by the USDA for that use. The water from the plant flows through line 12 to, in this embodiment, a raw water storage tank 26 such that excessive amount of raw water can be held while the process apparatus can be operated on some of the discharge. Also, some solids will settle out in this tank. The tank 26 is typically provided with a drain line 28. Water is pumped out of the tank 26 through line 30 through use of a pump 32. Alternatively, there can be gravity flow from tank 26 to reaction vessel 14. Typically, this pump can be an air diaphragm pump using air supplied via line 33. If desired, line 30 can have a flow meter 34, as indicated.

The line 30 discharges raw water into the reaction vessel 14. Preferably the vessel 14 includes a stirrer 35.

As indicated, sulfuric acid ($H_2SO_4$) enters the vessel through line 16A and chlorine ($Cl_2$) enters through line 16B. The acid (any suitable acid) is added in sufficient quantity to reduce the pH value of the raw water to a preferred range of about 3.0±0.5 units. The amount of acid will depend, in part, on the flow rate and the initial pH of the water. The chlorine oxidizes the color, helps break any emulsions, and kills bacteria in the raw water. The vessel 14 is typically provided with a drain 36.

This treatment of the raw water with the acid and chlorine produces a floc in the water, and this water/floc is transferred through line 38 into another vessel 40. Preferably, the vessel 40 is also provided with a stirrer 41. A polymer flocculant (i.e., thickener/strengthener) is added through line 42 to this vessel to fully develop the floc to enhance subsequent separation steps. Typically, the polymer is a product identified as TX 4027 as produced by Nalco, Chicago, Il. Other corresponding polymer flocculants as utilized in water treatment processes and as will be known by persons skilled in the art, can be utilized to fully develop the floc. Vessel 40 is also typically provided with a drain line 44 to the sewer for use in cleaning, etc.

The fully developed floc is transferred via line 18' to the separation vessel 20. Preferably separation is accomplished via dissolved air flotation. Air is introduced through line 46, and the solids leave through line 48. This separation vessel 20 has a drain line 50. The liquid phase, being substantially free of the grease, etc., passes through line 22 to a pH adjustment tank 52. As stated above, the water had been acidified to preferably about 3.0±0.5 pH units. For reuse, the pH needs to match that of available potable water. This typically is about neutral (pH=7) or slightly alkaline. This readjustment is accomplished by adding a suitable base, e.g., NaOH, through line 54 to the pH adjustment tank 52. If necessary or desired, additional chlorine can be added at this point via line 56. Complete mixing, as with a stirrer 58, is preferable.

As in the case of FIG. 1, separate vessels are depicted in FIG. 2 for the carrying out of the steps of the present invention. However, it may be desirable to incorporate several steps in a single vessel. Accordingly, the invention is not limited by these multiple vessels.

Although the water after this separation step may meet current USDA quality regulations, those regulations also require a filtration step. Accordingly, the pH-readjusted water phase is passed through line 60 to a conventional adsorption clarifier/filter combination as represented by the items labeled 62, 64, respectively. Details of these items will be known to persons skilled in the art. The fully cleansed water then goes through line 66 to a storage tank 68 so to be available for reuse in the plant. A pump 70 is generally provided for this purpose.

Provision is made to periodically backwash the adsorption clarifier/filter combination. This is effected by pumping finished water, via pump 72, through lines 74, 76, with the backwash then flowing through lines 78, 80 to the raw water storage tank 28 whereby this water can be subsequently passed through the treatment process. The clarifier may also be flushed using influent raw water. Provision is made to add additional chlorine to the processed water, if necessary or desired, through line 82.

The process illustrated in FIG. 2 has been tested in a pilot plant in conjunction with a chiller of a conventional poultry processing plant. Sulfuric acid was used for the adjustment of the pH to about 3.0±0.5 units, and chlorine was added as the oxidant. The acid/oxidant reaction occurred almost instantaneously such that a detention time in vessel 14 was five minutes or less. Although floc growth through the addition of Nalco TX 4027 was carried out in a separate vessel 40, this is not believed to be necessary in all applications of the present process. A detention time of about thirty minutes was found to be sufficient for a full floc growth. The product water from the process also met standards without the use of the anionic polymer.

The liquid (water and floc) was flowed into a dissolved air flotation unit 20. This unit was loaded at approximately one gallon of waste per square foot of flotation surface area. The solids were floated off the top as skimmings and were carried to other waste of the poultry processing plant. The clear liquid flowed over a weir in the separation unit and passed to vessel 52 where the pH was adjusted back to neutral (or slightly alkaline) with sodium hydroxide.

As stated above, present USDA regulations require the use of a filter as a final stage of treatment. Accordingly, the pilot plant utilized a filter bed containing a "mixed media" bed as used in conventional water treatment processes. A conventional sand bed or other conventional filtration devices can be used for this final filtration since the water feeding the filter in the pilot plant met the USDA specifications.

The pilot plant was operated for four weeks, and data was collected during each ½ day of operation. During this period of time, the light transmittance of the finished water product was usually in excess of about ninety-eight percent, and the turbidity was usually less than 2 NTU (nephelometric turbidity units). Samples of the raw chiller effluent water tested positive to salmonella bacteria and had high counts of all other bacteria. The product water tested negative to salmonella, had less than ten counts of $E.$ $coli$, coliform, and less than 100 aerobic counts. All these data are below the standards established by the USDA for reuse of the water in the poultry chiller. Further, these data are such that the product water could be used for many applications.

The process illustrated in FIG. 2 was also utilized to treat, and renovate, other water that is of the type discharged from a poultry processing plant. Such water typically has been used for several steps within the plant: bird washing and scalding, evisceration, washdown, etc. The product water was sufficiently treated such that it could be reused in the plant for most steps. At present, however, this renovated "process" water has not been approved by the USDA for use in steps wherein there is contact with the birds. Thus, a separate treatment plant would be required for the "process" water in contrast to the chiller water.

From the foregoing, it will be understood that a process has been developed to treat the water effluent from a poultry plant, with the product water being sufficiently purified such that it can be reused for various poultry processing steps with very little dilution. This accomplishment is of significant economical benefit to the poultry processing industry because of the savings in the amount of water purchased and in the reduced costs of waste disposal. The process has been approved by the USDA for treating the chiller water for reuse in the chiller, and is the only process so approved at this time.

Although only limited embodiments of the present invention have been described, this is not intended to limit the invention to those embodiments. Rather, the invention is to be limited only by the appended claims and their equivalents when taken together with the complete description.

We claim:

1. A process for the treatment of effluent water from processing poultry in a poultry processing plant to provide product water suitable for reuse in said plant, which comprises the steps of:

treating said effluent water with a strong oxidant selected from the group consisting of chlorine, potassium permanganate, ozone, and chlorine dioxide, to oxidize color and destroy bacteria, in combination with a pH-adjusting agent selected from the group consisting of sulfuric acid, nitric, acid, and hydrochloric acid, to adjust said effluent water to a pH of less than about 5.2 pH units to break oils and greases and to form a floc containing substantially all contaminants of said effluent water; and recovering a water phase from said floc, said water phase being suitable for reuse in said poultry processing plant.

2. The process of claim 1 wherein said effluent is adjusted to about 3.0±0.5 pH units.

3. The process of claim 1 wherein said pH-adjusting agent is added to said effluent prior to said strong oxidant.

4. The process of claim 1 wherein said strong oxidant is added to said effluent prior to said pH-adjusting agent.

5. The process of claim 1 wherein said strong oxidant and said pH-adjusting agent are added to said effluents simultaneously.

6. The process of claim 1 wherein said strong oxidant is chlorine.

7. The process of claim 1 wherein said pH-adjusting agent is sulfuric acid.

8. The process of claim 1 further comprising adding a polymeric thickener and strengthener to said effluent water after said strong oxidant and said pH-adjusting agent to enhance formation of said floc.

9. The process of claim 1 wherein said recovering step is carried out in a dissolved air flotation unit.

10. A process for the treatment of effluent water from a chiller tank of a poultry processing plant to provide product water suitable for reuse in said plant, which comprises the steps:

treating said effluent water with a strong oxidant selected from the group consisting of chlorine, potassium permanganate, ozone and chlorine dioxide to oxidize color of said effluent and destroy bacteria;

treating said effluent water with a pH-adjusting agent selected from the group consisting of sulfuric acid, nitric acid, and hydrochloric acid to achieve a pH of less than about 3.0±0.5 pH units to break oils and greases and to form a floc in said effluent water;

separating a water phase from said floc; and readjusting the pH of said water phase after separation from said floc to about that of make up water for said plant with a soluble hydroxide for reuse of said water phase in said plant.

11. The process of claim 10 wherein said pH-adjusting agent is added prior to said strong oxidant.

12. The process of claim 10 further comprising adding a polymeric thickener and strengthener to said effluent water after said strong oxidant and said pH-adjusting agent and prior to said separating step to enhance formation of said floc.

13. The process of claim 14 wherein said polymeric thickener and strengthener is an anionic polymer.

14. The process of claim 10 wherein said separating step is conducted in a dissolved air flotation unit.

15. The process of claim 10 wherein said strong oxidant is chlorine, said pH-adjusting agent is sulfuric acid, and said readjusting of pH is accomplished with sodium hydroxide.

16. A process for the treatment of effluent water from a poultry processing plant chiller tank to provide product water suitable for reuse in said chiller tank, which comprises the steps:

intimately treating said effluent water with chlorine and with sulfuric acid to oxidize constituents in said effluent and adjust the pH of said effluent water to 3.0±0.5 units to form a floc containing impurities in said effluent water;

intimately mixing with said effluent water, after said oxidation and pH adjustment to form said floc, an anionic polymer to enhance formation of said floc;

separating a water phase from said floc/water product of said polymer mixing with dissolved air flotation; and readjusting the pH of said water phase from said flotation separating step to about that of chiller tank make up water with sodium hydroxide.

17. The process of claim 16 further comprising passing said separated and pH readjusted water through a filter to obtain product water for reuse in said chiller tank.

* * * * *